United States Patent
Kelm

(10) Patent No.: US 9,545,997 B2
(45) Date of Patent: Jan. 17, 2017

(54) WINGTIP EXTENSION FOR REDUCING WAKE VORTICES OF AIRCRAFT

(75) Inventor: Roland Kelm, Hamburg (DE)

(73) Assignee: Airbus Operations GmbH (DE)

( * ) Notice: Subject to any disclaimer, the term of this patent is extended or adjusted under 35 U.S.C. 154(b) by 1107 days.

(21) Appl. No.: 12/746,806

(22) PCT Filed: Dec. 8, 2008

(86) PCT No.: PCT/EP2008/066997
§ 371 (c)(1),
(2), (4) Date: Aug. 3, 2010

(87) PCT Pub. No.: WO2009/074528
PCT Pub. Date: Jun. 18, 2009

(65) Prior Publication Data
US 2010/0294891 A1 Nov. 25, 2010

Related U.S. Application Data

(60) Provisional application No. 61/007,015, filed on Dec. 10, 2007.

(30) Foreign Application Priority Data

Dec. 10, 2007 (DE) .................. 10 2007 059 455

(51) Int. Cl.
*B64C 23/06* (2006.01)
(52) U.S. Cl.
CPC ............ *B64C 23/065* (2013.01); *Y02T 50/164* (2013.01)
(58) Field of Classification Search
USPC ......... 244/35 A, 35 R, 45 R, 91, 198, 199.3, 244/199.4, 201
See application file for complete search history.

(56) References Cited

U.S. PATENT DOCUMENTS 1,112,126 A * 9/1914 Emmons ..................... 244/35 R
3,369,775 A 2/1968 Rethorst
(Continued)

FOREIGN PATENT DOCUMENTS

CN 101228067 A 7/2008
DE 19909190 A1 9/2000
(Continued)

OTHER PUBLICATIONS

National Aeronautics and Space Administration, Dryden Flight Research Center / Fact Sheets, www.nasa.gov/centers/dryden/about/organizations/technology/facts/TF-2004-15-DFRC.html, Jan. 24, 2005.

*Primary Examiner* — Justin Benedik
(74) *Attorney, Agent, or Firm* — Lerner, David, Littenberg, Krumholz & Mentlik, LLP

(57) ABSTRACT

The invention relates to a wingtip extension comprising a leading edge and a trailing edge, which wingtip extension is affixable to an outer end of a wing, wherein the leading edge, at least in some sections, is essentially straight, and the straight section of the leading edge comprises a leading-edge sweep angle that exceeds the leading-edge sweep angle of the wing, and the local depth of the wingtip extension gradually decreases between a connecting region for connection to the wing and the outer end of the wingtip extension. By means of a wingtip extension according to the invention, in a delta wing a vortex burst region is positioned just behind the wingtip, as a result of which vortex burst region the cores of wingtip vortices burst and eventually become unstable, so that as a result of this the wake vortices of the aircraft can be reduced. The invention furthermore relates to a wing, comprising wingtip extensions according to the invention, as well as to an aircraft comprising such a wing.

15 Claims, 4 Drawing Sheets

(56) References Cited

U.S. PATENT DOCUMENTS

Figure 1:
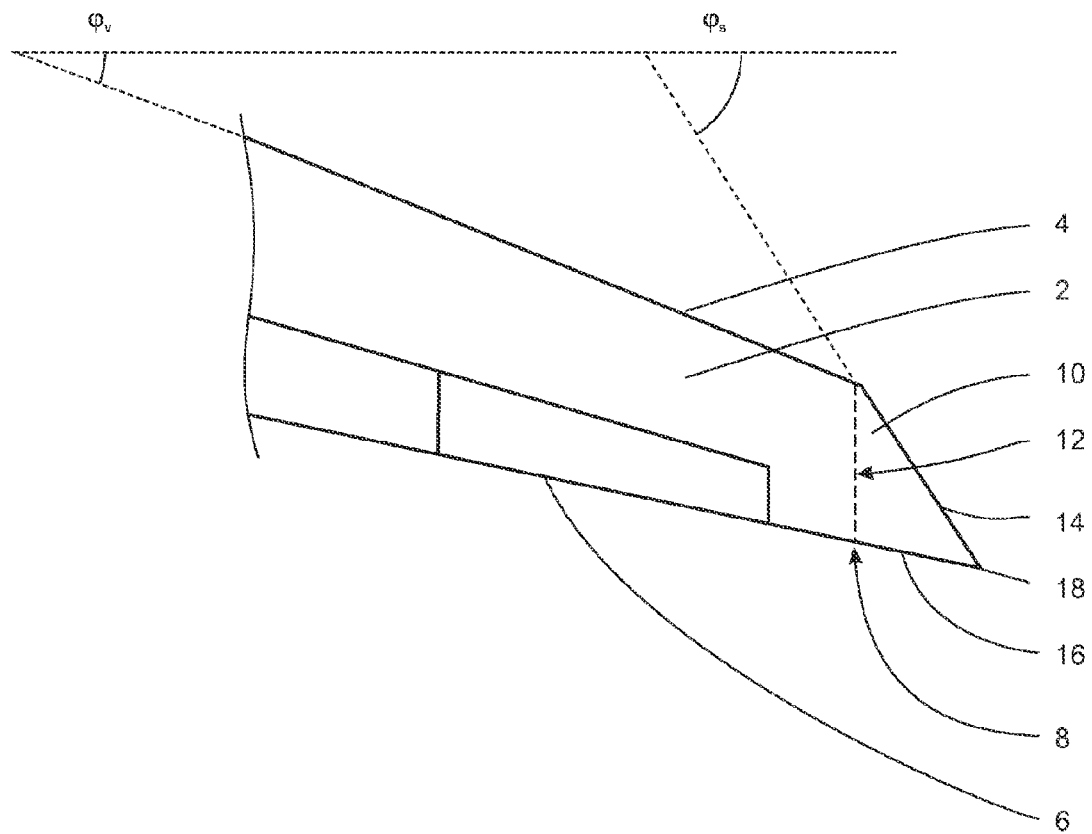

| | | | |
|---|---|---|---|
| 4,108,403 A | | 8/1978 | Finch |
| 4,700,911 A | * | 10/1987 | Zimmer ............... 244/35 R |
| 4,776,542 A | * | 10/1988 | Van Dam ............... 244/198 |
| 5,039,032 A | * | 8/1991 | Rudolph ............... 244/35 R |
| 5,348,253 A | * | 9/1994 | Gratzer ............... 244/91 |
| 6,089,502 A | * | 7/2000 | Herrick et al. ............ 244/35 R |
| 6,142,738 A | | 11/2000 | Toulmay |
| 8,083,185 B2 | * | 12/2011 | Konings et al. ............ 244/199.4 |
| 2004/0000619 A1 | | 1/2004 | Barriety |
| 2005/0281676 A1 | | 12/2005 | Egolf et al. |
| 2007/0018049 A1 | * | 1/2007 | Stuhr ............... 244/124 |

FOREIGN PATENT DOCUMENTS

| | | |
|---|---|---|
| DE | 102005017825 A1 | 10/2006 |
| EP | 1375342 A1 | 1/2004 |
| FR | 2772715 A1 | 6/1999 |
| JP | 04176795 A | 6/1992 |
| WO | 2006030213 A1 | 3/2006 |

* cited by examiner

WINGTIP EXTENSION FOR REDUCING WAKE VORTICES OF AIRCRAFT

CROSS-REFERENCE TO RELATED APPLICATIONS

This application is a national phase entry under 35 U.S.C. §371 of International Application No. PCT/EP2008/066997, filed Dec. 8, 2008, published in German, which claims the benefit of the filing date of U.S. provisional patent application No. 61/007,015, filed Dec. 10, 2007, and German patent application No. 10 2007 059 455.2, filed Dec. 10, 2007, the disclosures of which applications are hereby incorporated herein by reference.

The invention relates to a wingtip extension for reducing wake vortices of an aircraft. The invention furthermore also relates to a wing of an aircraft, which wing is adapted to reduce wake vortices of the aircraft.

Every aircraft comprising lift-generating airfoils creates wake vortices due to physical laws. The physical mechanism for generating lift on the wing consists of the air flow, in flight, along the wing underside experiencing less acceleration than it does along the wing top. This results in greater pressure on the underside of the wing relative to the top of the wing. For this reason the air flowing around the wing tries to create pressure equalisation between the underside and the top of the wing. This results in a flow around the wingtip in which flow the airstream is deflected by the pressure gradient around the wingtip. Consequently, on the top of the wing a speed component away from the wingtip results, while on the underside of the wing a speed component in the wingspan direction towards the wingtip results. Such flow around the wingtip results in circular movement of the air, which as a result of the layered airflow creates a vortex that propagates in a wake-like manner behind the aircraft. In larger aircraft such vortices can be so pronounced that smaller aircraft flying into the vortices are exposed to a serious danger of crashing. As a rule the vortices display very high stability, and consequently can still be in existence minutes after they were generated. In this process the vortex intensity depends among other things on the size and the weight of the aircraft, and consequently a minimum distance ("separation") is prescribed between aircraft that are taking off and aircraft that are landing. The lower the vortex intensity, the shorter the separation interval that is to be observed. The tendency towards increasing passenger numbers and thus also towards steadily increasing aircraft size, which aircraft in theory generate increasingly intense wake vortices, would result in an increase in the required separation interval. However, such an increased separation interval and the consequential reduction in takeoff and landing frequencies would counteract intended increased passenger numbers, so that options need to be created to reduce the intensity of wake vortices.

From the state of the art devices and systems are known that may reduce wake vortices. For example DE 10 2005 017825 A1 states that a component affixed to the outer end of a wing of an aircraft disturbs the swirling action of the air in the region of the outer wing by periodic swivel movements, thus reducing wingtip vortices and consequently also the arising wake vortices. Such a system is associated with a disadvantage in that it is an active system, which is relatively elaborate, cost-intensive and maintenance intensive and, furthermore, generates oscillating loads that may lead to fatigue fractures at the wingtip.

A further system is known from DE 199 09 190 C2, in which on each wing of the aircraft at least one vortex generator is arranged. The vortex generator generates an interference vortex, whose direction of rotation is the opposite of the direction of rotation of the wingtip vortex arising at the wing, which wingtip vortex is consequently destabilised and decays behind the aircraft. This system is associated with a disadvantage in that these additional interference vortices may reliably be generated to an adequate extent only in special configurations of the inner and outer landing flaps, and furthermore in that they generate increased drag. This is the case in particular when a fin arranged on the top of the wing, as presented in the above-mentioned printed publication, is used for permanently generating interference vortices.

Therefore, there may be a need for reducing or entirely eliminating the above-mentioned disadvantages. In particular, there may be a need to propose a simple system, which in an ideal case is a passive system, which supports accelerated vortex decay and thus significantly reduces the wake vortices that are present behind an aircraft during takeoff and landing.

The invention meets this need by a wingtip extension—as defined in claim 1—with a leading edge and a trailing edge, which wingtip extension may be affixed to an outer end of a wing, wherein the leading edge, at least in some sections, is essentially straight; the straight section of the leading edge comprises a leading-edge sweep angle that exceeds the leading-edge sweep angle of the wing, and the local depth of the wingtip extension gradually decreases between a connecting region for connection to the wing and the outer end of the wingtip extension. This wingtip extension takes advantage of the phenomenon of vortex burst, which phenomenon occurs with delta wings. In the context of delta wings it is known that, in particular at high angles of attack, the wingtip vortices generated by delta wings become increasingly unstable and "burst". Depending on the design of the wing, the angle of attack and the velocity, the so-called "vortex burst region" moves from a position behind the wing as far as into to the wing region; it may, in particular, be influenced by the sweep of the leading edge of the wing. Delta wings with a low leading-edge sweep (for example 45°) shift commencement of vortex burst towards lower angles of attack when compared to a higher leading-edge sweep (for example 70°). If a wingtip is modified in such a manner that it comprises suitable leading-edge sweep, the wake vortex decay is positively influenced. In this arrangement the leading edge of the wingtip extension does not have to be strictly straight, it may also be straight only in some sections. This results in various alternative leading-edge shapes, which comprise a kink, as is the case, for example, in a double delta wing or in a wing with a strake, or which are curved, in a manner that is similar to the airfoils of Concorde. In this arrangement the geometry of the wingtip extension at the wingtip is to be set in such a manner that, at the angles of attack common during takeoff and landing, bursting of the vortices takes place in a region between the leading edge and the trailing edge or only insignificantly further downstream. Consequently an arising wingtip vortex is influenced by a bursting vortex core to such an extent that starting from it the entire wingtip vortex decays significantly more rapidly than is the case with a conventional wingtip.

Further advantageous embodiments are stated in the subordinate claims.

Furthermore, the need may also be met by a wing of an aircraft, which wing is designed to reduce wake vortices of the aircraft and comprises a wingtip extension, affixed to the outer end of the wing, according to the explanations stated above.

Finally, the need may also be met by an aircraft comprising wings according to the above-mentioned criteria, as well as by the use of a wingtip extension according to the first main claim and the related subordinate claims.

Figure 2:
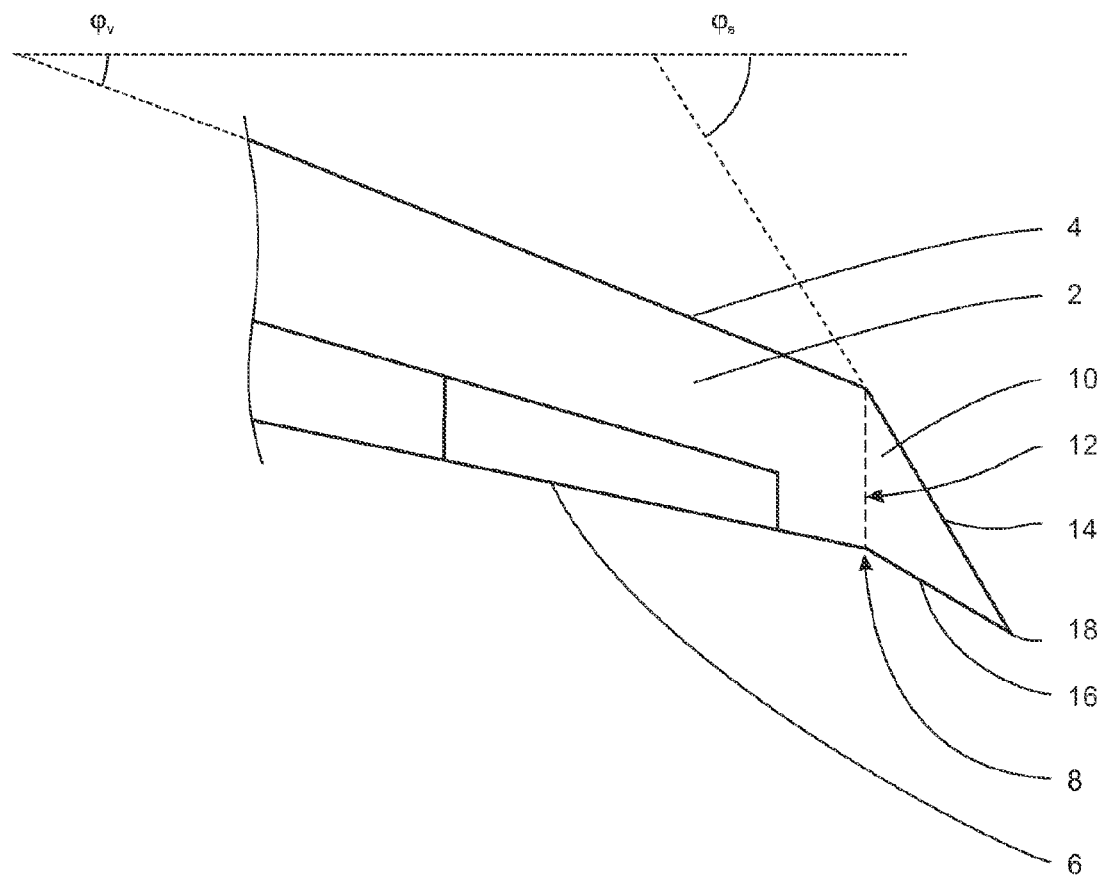
Figure 3:
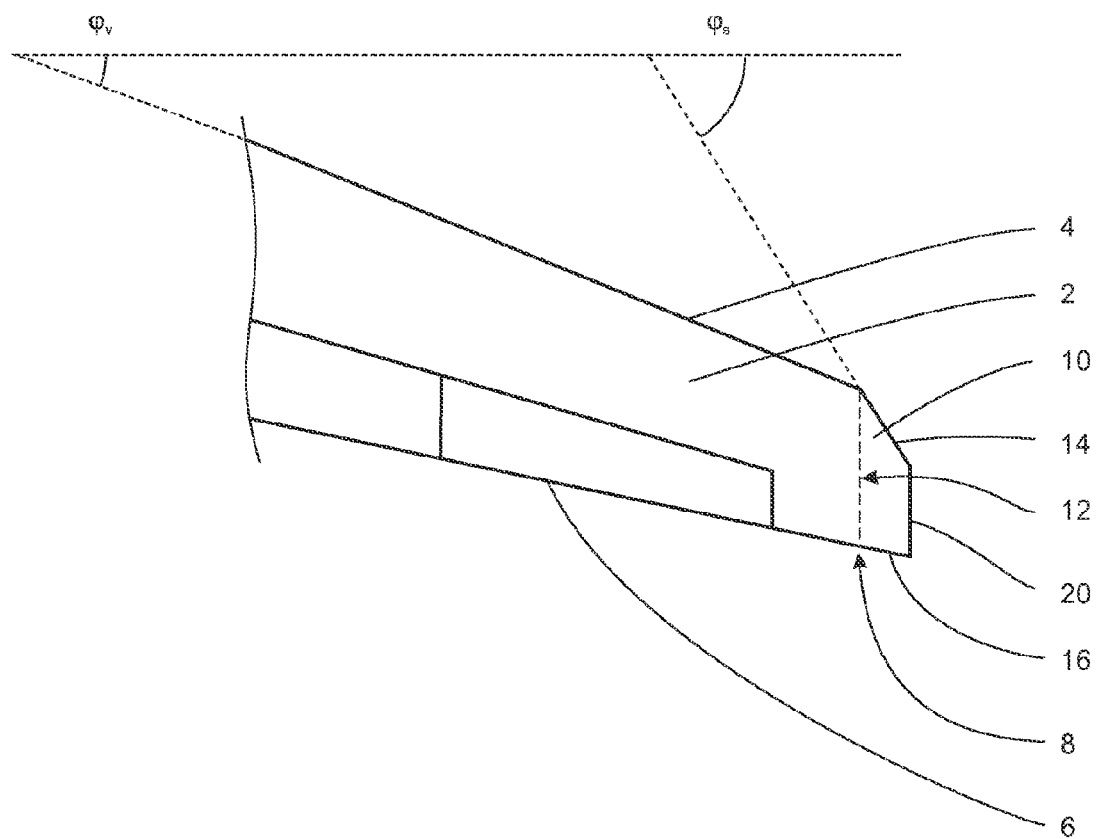
Figure 4:
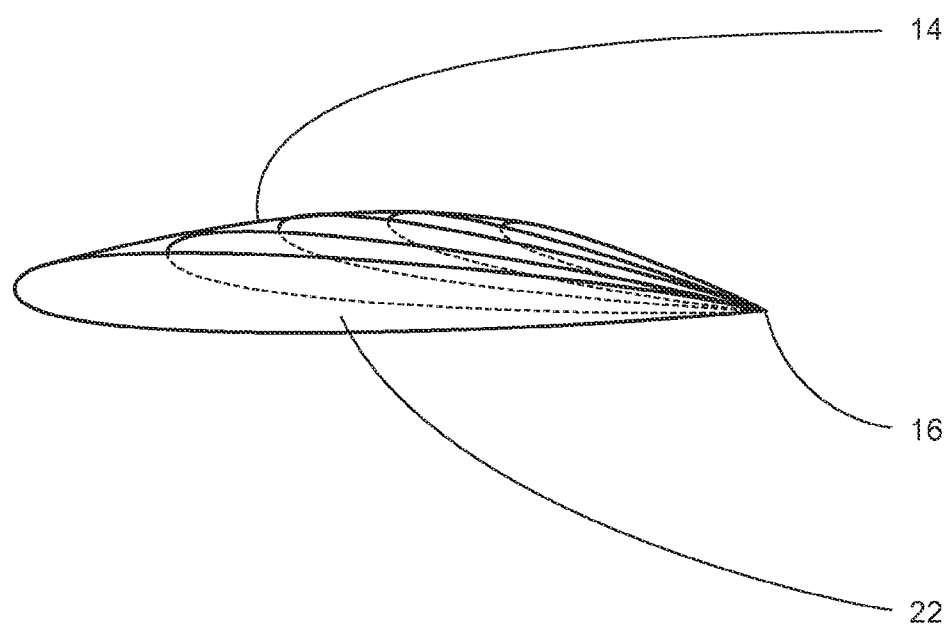

Below, the invention is explained in more detail with reference to the figures. In the figures, identical components have the same reference characters. The following are shown:

FIG. 1: a diagrammatic view of a wing section with a first exemplary embodiment of a wingtip extension;

FIG. 2: a diagrammatic view of a wing section with a second exemplary embodiment of a wingtip extension;

FIG. 3: a diagrammatic view of a wing section with a third exemplary embodiment of a wingtip extension; and FIG. 4: a diagrammatic view of a further variation of the wingtip extension according to the invention.

FIG. 1 shows the general design of the wingtip extension according to the invention. The diagram shows a wing section 2 with a leading edge 4, a trailing edge 6 and an outer wing end 8. The wingtip extension 10 is arranged on this outer wing end 8 and, for example, is connected to said outer wing end 8 by means of a suitable connecting method, for example riveting, welding, bonding, bolting, laminating etc. For this purpose the wingtip extension 10 comprises a connecting region 12.

The wingtip extension 10 according to the invention also comprises a leading edge 14 and a trailing edge 16. The leading edge 14 is clearly more swept when compared to the leading edge 4 of the wing, and consequently a clear kink results at the leading edges 4 and 14 at the point of connection between the wingtip extension 10 and the wing 2. The angle designated $\phi_s$ in FIG. 1 denotes the leading-edge sweep angle of the wingtip extension 10 according to the invention. The leading-edge sweep angle of the wing 2 is designated $\phi_v$. Generally speaking, in the usual commercial aircraft whose cruising speeds are in the trans-sonic range, $\phi_v$ is approximately 25-30°. In FIG. 1 the leading-edge sweep angle $\phi_s$ of the wingtip extension 10 is approximately 60°.

As a result of the strong sweep of the wingtip extension 10, a vortex burst region that is immanent to delta wings during the takeoff and landing phases is placed in such a manner that the cores of wingtip vortices burst behind the wingtips and consequently become unstable to such an extent that they decay comparatively quickly and cause a correspondingly significantly less pronounced wake vortex.

Depending on the size, on the specific aerodynamics and on further boundary conditions, the leading-edge sweep angle $\phi_s$ may be selected so as to be smaller or larger than the one shown in FIG. 1. In each case the angle of attack to be set during takeoff and/or landing is the design point to be observed, so that the delta wing effect shows to full advantage at this angle. In particular, angles ranging from 40° to 75° are imaginable.

In the exemplary embodiment of FIG. 1 the trailing edge 16 of the wingtip extension 10 according to the invention extends parallel to the trailing edge 6 of the wing 2. Consequently the entire trailing edge of the arrangement comprising the wing and the wingtip extension is uniform, since it is not necessary to specially design the trailing edge of the wingtip extension in relation to the delta wing effect.

In contrast to this, FIG. 2 shows an exemplary embodiment of the wingtip extension 10 according to the invention, in which wingtip extension 10 the trailing edge 16 has a greater sweep when compared to the trailing edge 6 of the wing 2, so that a kink arises also in the transition region of the two trailing edges 6 and 16. The illustrations in FIGS. 1 and 2 share a common feature in that the leading edge 14 and the trailing edge 16 meet at the extremity 18 of the wingtip extension 10 so that the outer end of the wingtip extension 10 arranged on the wing 2 comprises a tip.

FIG. 3 shows a further exemplary embodiment of the wingtip extension 10 according to the invention, in which wingtip extension 10 the outer end 18 of said wingtip extension 10 does not form a tip but instead an edge 20 that extends so as to be essentially parallel to the longitudinal axis of the aircraft. Consequently the trailing edge 16 and the leading edge 14 are always spaced apart from each other. If the trailing edge 16 of the wingtip extension and the trailing edge 6 of the wing 2 were to extend parallel to each other and if the sweep angle $\phi_s$ was relatively small, then the wingtip extension 10 would have to extend unnecessarily in the cross-sectional direction of the aircraft in order to form a tip as is the case in the first two exemplary embodiments.

In order to increase the delta wing effect it may furthermore be provided for all the shown wingtip extensions 10 to be positively warped. This means that the respective angle of attack of a local profile 22 of the wingtip extension 10—as diagrammatically shown in FIG. 4—rises towards the outer end 18. In this way a particularly harmonious transition between the wing 2 and the wingtip extension 10 may be obtained when for aerodynamic, construction-related or visual reasons a higher angle of attack is required. At the same time, warp tends to make it possible to implement larger sweep angles $\phi_s$, as a result of which in particular the drag behaviour of the wingtip extension 10 at trans-sonic flow may be improved. At this point it should be noted that the profile 22 of the wingtip extension 10 does not have to be of a conventional wing profile shape with a rounded profile leading edge. In order to utilise the delta wing effect it is sufficient to use a flat, board-like profile or to design the profile leading edge so that it tapers to a point so that vortex burst regions arise in a reliable manner.

The exemplary embodiments of the wingtip extension 10 according to the invention are not to be interpreted as limitations of the invention. The invention is defined by the subject of the claims. In particular, the invention is not limited to particular sweep angles of the wing or the wingtip extension; instead, any sweep angles between approximately 40° and 75° are imaginable, which sweep angles an average person skilled in the art may select, taking into account the aerodynamic context, the size of the aircraft, and the aircraft speeds.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

The invention claimed is:

1. A wingtip extension for a wing of an aircraft for reducing of wake vortices, comprising:
 a leading edge at least partially being substantially straight; and a trailing edge configured to be affixable to a connection region of the wing;
wherein a straight section of the leading edge comprises a leading-edge sweep angle exceeding the leading-edge sweep angle of the wing;
wherein a local depth of the wingtip extension corresponds to a local depth of the wing in the connection region;
wherein a local depth of the wingtip extension gradually decreases between a connecting region for connection to the wing and the opposite end of the wingtip extension
wherein the wingtip is configured such that a wingtip vortex arising from the wingtip is influenced by a bursting vortex core such that the wingtip vortex starts to decay; and
wherein a cross-sectional profile of the wingtip extension is substantially flat or at least at the leading edge is tapered to a point.

2. The wingtip extension of claim 1, wherein the trailing edge is essentially straight.

3. The wingtip extension of claim 1, wherein the trailing edge extends so as to be substantially parallel to the trailing edge of the wing.

4. The wingtip extension of claim 1, wherein the leading edge and the trailing edge converge in such a manner that an outer end of the wingtip extension forms a point.

5. The wingtip extension of claim 1, wherein the leading edge and the trailing edge are spaced apart from each other at an outer end of the wingtip extension.

6. The wingtip extension of claim 1, wherein the trailing edge comprises a trailing edge sweep angle larger than a trailing edge sweep angle of the wing.

7. The wingtip extension of claim 1, wherein the wingtip extension comprises a positive distortion so that a local angle of attack of the wingtip extension increases towards the outside.

8. The wingtip extension of claim 1, wherein the leading-edge sweep angle ranges from 40° to 75°.

9. The wingtip extension of claim 1, wherein the leading-edge sweep angle is about 60°.

10. The wingtip extension of claim 1, wherein the leading-edge sweep angle is about 70°.

11. An aircraft comprising first and second wings, each of first and second wings comprising a wingtip extension arranged at a connection region of the respective wing, wherein the wingtip extension comprises:
a leading edge at least partially being substantially straight; and
a trailing edge configured to be affixable to a connection region of the wing;
wherein a straight section of the leading edge comprises a leading-edge sweep angle exceeding the leading-edge sweep angle of the wing;
wherein a local depth of the wingtip extension corresponds to a local depth of the wing in the connection region;
wherein a local depth of the wingtip extension gradually decreases between a connecting region for connection to the wing and the opposite end of the wingtip extension;
wherein the wingtip is configured such that a wingtip vortex arising from the wingtip is influenced by a bursting vortex core such that the wingtip vortex starts to decay; and
wherein a cross-sectional profile of the wingtip extension is substantially flat or at least at the leading edge is tapered to a point.

12. A method for reducing wake vortices of an aircraft, the method comprising:
affixing a wingtip extension to an outer edge of a wing of the aircraft;
wherein a leading edge of the wingtip extension is at least partially substantially straight and a trailing edge is affixed to a connection region of the wing and wherein a straight section of the leading edge comprises a leading-edge sweep angle exceeding a leading-edge sweep angle of the wing; and
causing a vortex to burst in a region between the leading edge and the trailing edge of the wingtip extension such that an arising wingtip vortex is influenced by the bursting core of the vortex to such an extent as to cause decay of the wingtip vortex.

13. The method of claim 12, wherein the bursting the vortex in the region between the leading edge and the trailing edge occurs at angles of attack common during takeoff and landing of the aircraft.

14. The method of claim 12, further comprising causing the core of the wingtip vortex to burst behind the wingtip.

15. The method of claim 12, further comprising positively warping the wingtip extension.

* * * * *